United States Patent
Chen et al.

(10) Patent No.: US 10,701,393 B2
(45) Date of Patent: Jun. 30, 2020

(54) METHOD AND APPARATUS OF REORDERING MOTION VECTOR PREDICTION CANDIDATE SET FOR VIDEO CODING

(71) Applicant: MEDIATEK INC., Hsinchu (TW)

(72) Inventors: Chun-Chia Chen, Hsinchu (TW); Chih-Wei Hsu, Hsinchu (TW); Ching-Yeh Chen, Hsinchu (TW); Yu-Wen Huang, Hsinchu (TW); Tzu-Der Chuang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/611,611

(22) PCT Filed: May 8, 2018

(86) PCT No.: PCT/CN2018/085931
§ 371 (c)(1),
(2) Date: Nov. 7, 2019

(87) PCT Pub. No.: WO2018/205914
PCT Pub. Date: Nov. 15, 2018

(65) Prior Publication Data
US 2020/0068218 A1    Feb. 27, 2020

Related U.S. Application Data

(60) Provisional application No. 62/531,907, filed on Jul. 13, 2017, provisional application No. 62/504,002, filed on May 10, 2017.

(51) Int. Cl.
*H04N 19/56* (2014.01)
*H04N 19/105* (2014.01)
(Continued)

(52) U.S. Cl.
CPC .......... *H04N 19/56* (2014.11); *H04N 19/105* (2014.11); *H04N 19/139* (2014.11);
(Continued)

(58) Field of Classification Search
None
See application file for complete search history.

(56) References Cited

U.S. PATENT DOCUMENTS 8,902,978 B2 * 12/2014 Lim .................. H04N 19/11
375/240.12
9,124,898 B2 * 9/2015 Tsai .................. H04N 19/52
(Continued)

FOREIGN PATENT DOCUMENTS

CN      102934434 A      2/2013
CN      103609121 A      2/2014
(Continued)

OTHER PUBLICATIONS

International Search Report dated Jul. 27, 2018, issued in application No. PCT/CN2018/085931.

*Primary Examiner* — Reza Aghevli
(74) *Attorney, Agent, or Firm* — McClure, Qualey & Rodack, LLP

(57) ABSTRACT

Method and apparatus of Inter prediction for video coding performed by a video encoder or a video decoder that utilizes motion vector prediction (MVP) to code a motion vector (MV) associated with a block coded with Inter mode are disclosed. According to one method, an initial MVP candidate list is generated for the current block. When candidate reordering is selected for the current block, target candidates within a selected candidate set are reordered to generate a reordered MVP candidate list and then the current block is encoded at the video encoder side or decoded at the video decoder sider using the reordered MVP candidate list,
(Continued)

where the selected candidate set comprises at least partial candidates of the initial MVP candidate list.

20 Claims, 10 Drawing Sheets

(51) Int. Cl.
    *H04N 19/139*     (2014.01)
    *H04N 19/176*     (2014.01)
    *H04N 19/52*     (2014.01)
    *H04N 19/82*     (2014.01)
    *H04N 19/523*     (2014.01)

(52) U.S. Cl.
    CPC ........... *H04N 19/176* (2014.11); *H04N 19/52* (2014.11); *H04N 19/82* (2014.11); *H04N 19/523* (2014.11)

(56) References Cited

U.S. PATENT DOCUMENTS

| | | |
|---|---|---|
| 9,258,562 B2 | 2/2016 | Zhang et al. |
| 9,282,338 B2 | 3/2016 | Zheng et al. |
| 9,325,990 B2 | 4/2016 | Chen et al. |
| 9,398,303 B2 * | 7/2016 | Lim ..................... H04N 19/182 |
| 9,961,364 B2 | 5/2018 | Tsai et al. |
| 10,567,789 B2 * | 2/2020 | Chen .................... H04N 19/176 |
| 2013/0188715 A1 * | 7/2013 | Seregin ................. H04N 19/52 |
| | | 375/240.16 |
| 2015/0078438 A1 * | 3/2015 | Lim ....................... H04N 19/50 |
| | | 375/240.02 |
| 2015/0085932 A1 * | 3/2015 | Lin ..................... H04N 19/597 |
| | | 375/240.16 |
| 2017/0127082 A1 * | 5/2017 | Chen ...................... H04N 19/56 |
| 2018/0359483 A1 * | 12/2018 | Chen ...................... H04N 19/44 |
| 2018/0376149 A1 * | 12/2018 | Zhang .................. H04N 19/182 |
| 2018/0376160 A1 * | 12/2018 | Zhang .................... H04N 19/58 |
| 2019/0373268 A1 * | 12/2019 | Lim ..................... H04N 19/513 |

FOREIGN PATENT DOCUMENTS

| | | |
|---|---|---|
| CN | 104170389 A | 11/2014 |
| CN | 104350749 A | 2/2015 |
| CN | 104838656 A | 8/2015 |

* cited by examiner

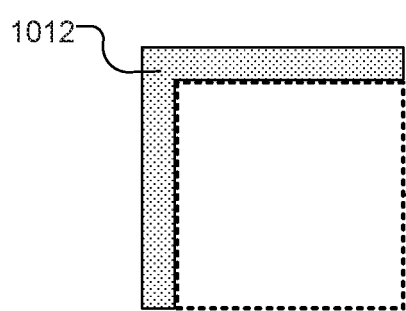
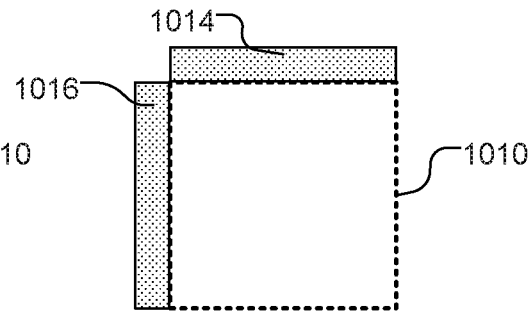
Fig. 10A        Fig. 10B
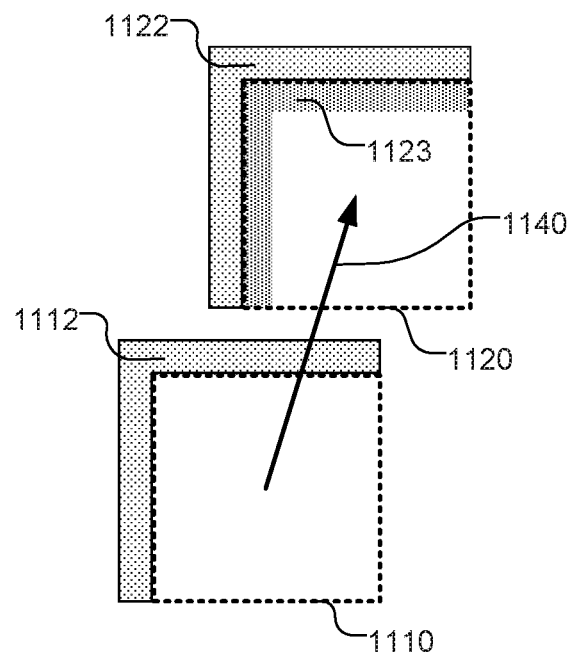
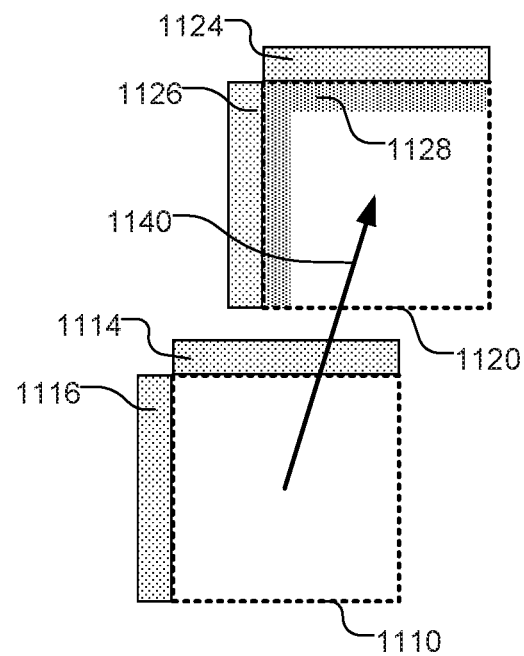
Fig. 11A        Fig. 11B

METHOD AND APPARATUS OF REORDERING MOTION VECTOR PREDICTION CANDIDATE SET FOR VIDEO CODING

CROSS REFERENCE TO RELATED APPLICATIONS

The present invention claims priority to U.S. Provisional Patent Application Ser. No. 62/504,002, filed on May 10, 2017, and U.S. Provisional Patent Application Ser. No. 62/531,907, filed on Jul. 13, 2017. The U.S. Provisional patent applications are hereby incorporated by reference in their entireties.

FIELD OF INVENTION

The present invention relates to motion estimation/compensation and predictive coding of motion vector (MV). In particular, the present invention relates to reordering of candidates in a candidate list utilizing the template of a current block and the template of one or more reference blocks to improve coding performance.

BACKGROUND OF THE INVENTION

Motion estimation/compensation is a powerful coding tool that has been used in various coding standards such as MPEG-2, H.264 and the emerging HEVC (High Efficiency Video Coding) standard. The motion information derived at the encoder side has to be transmitted to the decoder side, which may consume sizeable bandwidth. In order to improve the coding efficiency for motion information, motion vector prediction (MVP) to coding a current motion vector (MV) predictively has been developed.

Merge Mode and AMVP Mode

For each Inter PU, one or two motion vectors (MVs) are determined using motion estimation. In order to increase the coding efficiency of motion vector (MV) coding in HEVC, HEVC motion vector prediction (MVP) to encode MV predictively. In particular, HEVC supports the Skip and Merge modes for MVP coding. For Skip and Merge modes, a set of candidates are derived based on the motion information of spatially neighbouring blocks (spatial candidates) or a temporal co-located block (temporal candidate). When a PU is coded using the Skip or Merge mode, no motion information is signalled. Instead, only the index of the selected candidate is coded. For the Skip mode, the residual signal is forced to be zero and not coded. In other words, no information is signalled for the residuals. Each merged PU reuses the MV, prediction direction, and reference picture index of the selected candidate.

For Merge mode in HEVC, up to four spatial MV candidates are derived from neighbouring blocks A0, A1, B0 and B1, and one temporal MV candidate is derived from bottom-right block, TBR or centre-block TCT as shown in FIG. 1. For the temporal candidate, TBR is used first. If TBR is not available, TCT is used instead. Note that if any of the four spatial MV candidates is not available, the block B2 is then used to derive MV candidate as a replacement. After the derivation process of the four spatial MV candidates and one temporal MV candidate, removing redundancy (pruning) is applied to remove any redundant MV candidate. If after removing redundancy (pruning), the number of available MV candidates is smaller than five, three types of additional candidates are derived and are added to the candidate set (candidate list). The encoder selects one final candidate within the candidate set for Skip or Merge mode based on the rate-distortion optimization (RDO) decision, and transmits the index to the decoder.

Since the derivations of Skep and Merge candidates are similar, the "Merge" mode referred hereafter may correspond to "Merge" mode as well as "Skip" mode for convenience.

The MVP technique is also applied to code a motion vector predictively, which is referred as AMVP (Advanced Motion Vector Prediction). When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the AMVP scheme is used to select a motion vector predictor among an AMVP candidate set including two spatial MVPs and one temporal MVP. Therefore, an AMVP index for MVP and the corresponding MVDs need to be encoded and transmitted for an AMVP-coded block. In addition, the Inter prediction direction to specify the prediction directions among bi-prediction and uni-prediction (i.e., list 0 (L0) and/or list 1 (L1)) associated with the reference frame index for each list should also be encoded and transmitted.

When a PU is coded in either Skip or Merge mode, no motion information is transmitted except the Merge index of the selected candidate since the Skip and Merge modes utilize motion inference methods (i.e., MV=MVP+MVD where MVD being zero) to obtain the motion information from the selected Merge/Skip candidate.

In AMVP, the left MVP is selected based on the first available one from A0, A1, the top MVP is the first available one from B0, B1, B2, and the temporal MVP is the first available one from TBR or TCT (TBR is used first, if TBR is not available, TCT is used instead). If the left MVP is not available and the top MVP is not scaled MVP, the second top MVP can be derived if there is a scaled MVP among B0, B1, and B2. The list size of MVPs of AMVP is 2 in HEVC. Therefore, after the derivation process of the two spatial MVPs and one temporal MVP, only the first two MVPs can be included in the MVP list. If after removing redundancy, the number of available MVPs is less than two, zero vector candidates are added to the candidates list.

Bilateral Template MV Refinement

Bilateral Template MV Refinement (BTMVR) is also referred as Decoder-side MV refinement (DMVR) in some literature. For example, in JVET-D0029 (Xu Chen, et al., "Decoder-Side Motion Vector Refinement Based on Bilateral Template Matching", Joint Video Exploration Team (JVET) of ITU-T SG 16 WP 3 and ISO/IEC JTC 1/SC 29/WG 11, 4th Meeting: Chengdu, CN, 15-21 Oct. 2016, Document: JVET-D0029), Decoder-Side Motion Vector Refinement (DMVR) based on bilateral template matching is disclosed. The process of BTMVR is shown in FIG. 2, where block 210 is a current block. Initial motion vectors MV0 220a and MV1 220b for current block 210 are determined.

In BTMVR (i.e., DMVR), it uses two-stage search to refine the MVs of the current block. For a current block, the cost of current MV candidate is first evaluated. In the first stage search, the integer-pixel search is performed around the current pixel location. Eight candidates are evaluated. The horizontal distance, vertical distance or both between two adjacent circles or between the square symbol and the adjacent circle is one pixel. The best candidate with the lowest cost is selected as the best MV candidate in the first stage. In the second stage, a half-pixel square search is performed around the best MV candidate in the first stage. The best MV candidate with the lowest cost is selected the final MV for the final motion compensation.

When the underlying video data correspond to colour video, the Bilateral Template MV Refinement process may also be applied to the colour components. As is known in the field, colour video may be in various colour format, such as YUV or YCrCb colour components with different colour sampling formats such as 4:4:4, 4:2:2 and 4:2:0. For example, when the colour video is in the YCrCb420 format, the Cr and Cb chrominance components have half vertical resolution and half horizontal resolution of the Y luminance component. A motion vector derived based on the Y component needs to be scaled before the motion vector is used for the chrominance components.

Pattern-Based MV Derivation (PMVD)

FIG. 3 illustrates an example of FRUC (Frame Rate Up Conversion) bilateral matching mode, where the motion information for a current block 310 is derived based on two reference pictures. The motion information of the current block is derived by finding the best match between two reference blocks (320 and 330) along the motion trajectory 340 of the current block in two different reference pictures (i.e., Ref0 and Ref1). Under the assumption of continuous motion trajectory, the motion vectors MV0 associated with Ref0 and MV1 associated with Ref1 pointing to the two reference blocks shall be proportional to the temporal distances, i.e., TD0 and TD1, between the current picture (i.e., Cur pic) and the two reference pictures Ref0 and Ref1.

FIG. 4 illustrates an example of template matching FRUC (Frame Rate Up Conversion) mode. The neighbouring areas (420a and 420b) of the current block 410 in a current picture (i.e., Cur pic) are used as a template to match with a corresponding template (430a and 430b) in a reference picture (i.e., Ref0 in FIG. 4). The best match between template 420a/420b and template 430a/430b will determine a decoder derived motion vector 440. While Ref0 is shown in FIG. 4, Ref1 can also be used as a reference picture.

According to VCEG-AZ07, a FRUC_mrg_flag is signalled when the merge_flag or skip_flag is true. If the FRUC_mrg_flag is 1, then FRUC_merge_mode is signalled to indicate whether the bilateral matching merge mode or template matching merge mode is selected. If the FRUC_mrg_flag is 0, it implies that regular merge mode is used and a merge index is signalled in this case. In video coding, in order to improve coding efficiency, the motion vector for a block may be predicted using motion vector prediction (MVP), where a candidate list is generated. A merge candidate list may be used for coding a block in a merge mode. When the merge mode is used to code a block, the motion information (e.g. motion vector) of the block can be represented by one of the candidates MV in the merge MV list. Therefore, instead of transmitting the motion information of the block directly, a merge index is transmitted to a decoder side. The decoder maintains a same merge list and uses the merge index to retrieve the merge candidate as signalled by the merge index. Typically, the merge candidate list consists of a small number of candidates and transmitting the merge index is much more efficient than transmitting the motion information. When a block is coded in a merge mode, the motion information is "merged" with that of a neighbouring block by signalling a merge index instead of explicitly transmitted. However, the prediction residuals are still transmitted. In the case that the prediction residuals are zero or very small, the prediction residuals are "skipped" (i.e., the skip mode) and the block is coded by the skip mode with a merge index to identify the merge MV in the merge list.

While the term FRUC refers to motion vector derivation for Frame Rate Up-Conversion, the underlying techniques are intended for a decoder to derive one or more merge MV candidates without the need for explicitly transmitting motion information. Accordingly, the FRUC is also called decoder derived motion information in this disclosure. Since the template matching method is a pattern-based MV derivation technique, the template matching method of the FRUC is also referred as Pattern-based MV Derivation (PMVD) in this disclosure.

In the decoder side MV derivation method, a new temporal MVP called temporal derived MVP is derived by scanning all MVs in all reference pictures. To derive the LIST_0 temporal derived MVP, for each LIST_0 MV in the LIST_0 reference pictures, the MV is scaled to point to the current frame. The 4×4 block that pointed by this scaled MV in current frame is the target current block. The MV is further scaled to point to the reference picture that refIdx is equal 0 in LIST_0 for the target current block. The further scaled MV is stored in the LIST_0 MV field for the target current block. FIG. 5A and FIG. 5B illustrate examples for deriving the temporal derived MVPs for LIST_0 and LIST_1 respectively. In FIG. 5A and FIG. 5B, each small square block corresponds to a 4×4 block. The temporal derived MVPs process scans all the MVs in all 4×4 blocks in all reference pictures to generate the temporal derived LIST_0 and LIST_1 MVPs of current frame. For example, in FIG. 5A, blocks 510, blocks 512 and blocks 514 correspond to 4×4 blocks of the current picture (Cur. pic), LIST_0 reference picture with index equal to 0 (i.e., refidx=0) and LIST_0 reference picture with index equal to 1 (i.e., refidx=1) respectively. Motion vectors 520 and 530 for two blocks in LIST_0 reference picture with index equal to 1 are known. Then, temporal derived MVP 522 and 532 can be derived by scaling motion vectors 520 and 530 respectively. The scaled MVP is then assigned it to a corresponding block. Similarly, in FIG. 5B, blocks 540, blocks 542 and blocks 544 correspond to 4×4 blocks of the current picture (Cur. pic), LIST_1 reference picture with index equal to 0 (i.e., refidx=0) and LIST_1 reference picture with index equal to 1 (i.e., refidx=1) respectively. Motion vectors 550 and 560 for two blocks in LIST_1 reference picture with index equal to 1 are known. Then, temporal derived MVP 552 and 562 can be derived by scaling motion vectors 550 and 560 respectively.

For the bilateral matching merge mode and template matching merge mode, two-stage matching is applied. The first stage is PU-level matching, and the second stage is the sub-PU-level matching. In the PU-level matching, multiple initial MVs in LIST_0 and LIST_1 are selected respectively. These MVs includes the MVs from merge candidates (i.e., the conventional merge candidates such as these specified in the HEVC standard) and MVs from temporal derived MVPs. Two different staring MV sets are generated for two lists. For each MV in one list, a MV pair is generated by composing of this MV and the mirrored MV that is derived by scaling the MV to the other list. For each MV pair, two reference blocks are compensated by using this MV pair. The sum of absolutely differences (SAD) of these two blocks is calculated. The MV pair with the smallest SAD is selected as the best MV pair.

Local Illumination Compensation (LIC)

Local Illumination Compensation (LIC) is a method to perform Inter prediction using neighbour samples of the current block and a reference block. It is based on a linear model using a scaling factor a and an offset b. The method derives the scaling factor a and the offset b by referring to the neighbour samples of the current block and the reference block. Moreover, the LIC process can be enabled or disabled adaptively for each CU.

More details regarding LIC can be found in JVET-C1001 ((Xu Chen, et al., "Algorithm Description of Joint Exploration Test Model 3", Joint Video Exploration Team (JVET) of ITU-T SG 16 WP 3 and ISO/IEC JTC 1/SC 29/WG 11, 3rd Meeting: Geneva, CH, 26 May-1 Jun. 2016, Document: JVET-C1001).

Advanced Motion Vector Resolution (AMVR)

To improve the coding gain, the Advanced Motion Vector Resolution (AMVR) has also been introduced recently. The AMVR can adaptively switch the resolution of Motion Vector Difference (MVD). The Motion Vector Difference (MVD) between a current MV and the MV predictor of a PU) can be coded with either quarter-pel resolution or integer-pel resolution. The switching is controlled at coding unit (CU) level and an integer MVD resolution flag is (conditionally) signalled.

More details regarding AMVR can be found in JVET-C1001 ((Xu Chen, et al., "Algorithm Description of Joint Exploration Test Model 3", Joint Video Exploration Team (JVET) of ITU-T SG 16 WP 3 and ISO/IEC JTC 1/SC 29/WG 11, 3rd Meeting: Geneva, CH, 26 May-1 Jun. 2016, Document: JVET-C1001).

In JVET-E0076 (Chen et al., "EE5EE4: Enhanced Motion Vector Difference Coding", Joint Video Exploration Team (JVET) of ITU-T SG 16 WP 3 and ISO/IEC JTC 1/SC 29/WG 11, the 5th JVET meeting, January 2017, Geneva, Document: JVET-E0076), a modified MVD coding method has been adopted. The modified MVD coding method includes two elements: a) 4-pel accuracy for MVD signalling (in addition to ¼-pel and integer-pel MVD accuracy, and b) switchable binarization and context model selection. According to JVET-E0076, a first flag is signalled to indicate whether ¼-pel MV precision for the luma signal is used in a CU. When the first flag indicates that ¼-pel MV precision for the luma signal is not used, another flag is signalled to indicate whether integer luma sample or four luma samples MV precision is used.

In the following disclosure, various techniques to improve the coding efficiency by utilizing the template of a current block and the template of one or more reference blocks, previous coded data or information are described.

SUMMARY OF THE INVENTION

Method and apparatus of Inter prediction for video coding performed by a video encoder or a video decoder that utilizes motion vector prediction (MVP) to code a motion vector (MV) associated with a block coded with Inter mode are disclosed. According to one method, input data related to a current block in a current picture at a video encoder side or a video bitstream corresponding to compressed data including the current block at a video decoder side are received, where the current block consists of a set of pixels of video data. An initial MVP candidate list is generated for the current block. According to the present invention, when candidate reordering is selected for the current block, target candidates within a selected candidate set are reordered to generate a reordered MVP candidate list and then the current block is encoded at the video encoder side or decoded at the video decoder sider using the reordered MVP candidate list, where the selected candidate set comprises at least partial candidates of the initial MVP candidate list.

In one embodiment, said reordering the target candidates comprises estimating costs of the target candidates based on upper neighbour conditions or left neighbour conditions of the current block, or first template of the current block and second template of one or more corresponding reference blocks. For example, the first template of the current block may comprise first pixels located above the current block, on a left side of the current block, or both, and the second template of said one or more corresponding reference blocks may comprise second pixels located above said one or more corresponding reference blocks, on a left side of said one or more corresponding reference blocks, or both. In another example, the first template of the current block may comprise NC rows of first pixels located above the current block and MC columns of first pixels on a left side of the current block, and the second template of said one or more corresponding reference blocks may comprise NR rows of second pixels located above said one or more corresponding reference blocks and MR columns of second pixels on a left side of said one or more corresponding reference blocks, where NC, MC, NR and MR are integers greater than 0. In yet another example, the first template of the current block may further comprise a block of first pixels located across an upper-left corner of the current block to form a first L-shaped area; and the second template of said one or more corresponding reference blocks further comprises a block of second pixels adjacent to an upper-left corner of said one or more corresponding reference blocks to form a second L-shaped area. The NC, MC, NR and MR may be determined according to the shape or size of the current block, or QP (quantization parameter) value of a current slice covering the current block.

In one embodiment, the costs of the target candidates are estimated based on sub-sampled first pixels in the first template of the current block and sub-sampled second pixels in the second template of said one or more corresponding reference blocks. Whether to use the sub-sampled first pixels and the sub-sampled second pixels for estimating the costs of the target candidates may depend on the size of the current block.

In yet another embodiment, for first pixels in the first template of the current block and second pixels in the second template of said one or more corresponding reference blocks, the costs of the target candidates are estimated based on the first pixels above the current block and the second pixels above said one or more corresponding reference blocks only, or based on the first pixels to a left side of the current block and the second pixels to a left side of said one or more corresponding reference blocks only. Whether to use the first pixels above the current block and the second pixels above said one or more corresponding reference blocks only for estimating the costs of the target candidates or to use the first pixels to a left side of the current block and the second pixels to a left side of said one or more corresponding reference blocks only for estimating the costs of the target candidates depends on size of the current block.

The corresponding reference blocks can be located according to the motion vectors of the current block, where one corresponding reference block is used for estimating the costs of the target candidates when the current block is uni-predicted, and two corresponding reference blocks are used for estimating costs of the target candidates when the current block is bi-predicted. The costs of the target candidates may be estimated based on measurement comprising Sum of Absolute Differences (SAD) and Sum of Squared Differences (SSD) between first pixels in the first template of the current block and second pixels in the second template of one or more corresponding reference blocks. Furthermore, bilinear filtering may be applied to first pixels in the first template of the current block and second pixels in the second template of one or more corresponding reference blocks, and the costs of the target candidates are then estimated based on measurement comprising Sum of Absolute Differences (SAD) and Sum of Squared Differences (SSD) between filtered first pixels and filtered second pixels.

In one embodiment, said estimating costs of the target candidates may comprise adjusting initial estimated costs associated with the target candidates. For example, the initial estimated costs are adjusted according to candidate type or candidate index.

Reordering the target candidates within the selected candidate set may correspond to moving a first target candidate to a location in front of a second target candidate when the first target candidate has a lower cost than the second target candidate and the first target candidate is after the second target candidate in the initial MVP candidate list. In another example, an additional condition corresponding to a ratio of a second cost of the second target candidate to a first cost of the first target candidate being larger than a pre-defined threshold for reordering the first candidate and the second candidate.

In one embodiment, whether the candidate reordering is selected for the current block depends on the shape, size or QP (quantization parameter) value of the current block or size of the current picture.

In one embodiment, the selected candidate set may correspond to member candidates of the initial MVP candidate set having a merge index smaller than or equal to a threshold, belonging to one or more selected candidate types, or both.

In one embodiment, the selected candidate set corresponds to member candidates of the initial MVP candidate set belonging to one or more selected candidate types.

BRIEF DESCRIPTION OF THE DRAWINGS

FIG. 10A illustrates an example of the template for a target block corresponding to an L-shaped area covering pixels above the target block, pixels to the left of the target block and the pixels to the upper-left corner of the target block.

FIG. 10B illustrates an example of the template for a target block corresponding to an L-shaped area covering pixels above the target block and pixels to the left of the target block.

FIG. 11A illustrates an example of the L-shaped templates of the current block and the reference block for estimating the cost, where the L-shaped templates cover all pixels in the L-shaped areas.

FIG. 11B illustrates an example of the L-shaped templates of the current block and the reference block for estimating the cost, where the L-shaped templates cover separate top part and left part of the L-shaped areas.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

In this disclosure, a template outside a current block and a corresponding template outside a reference block are utilized to derive information for improving coding efficiency.

Template-Based Mode Selection for Adaptive Motion Vector Resolution

Figure 1:
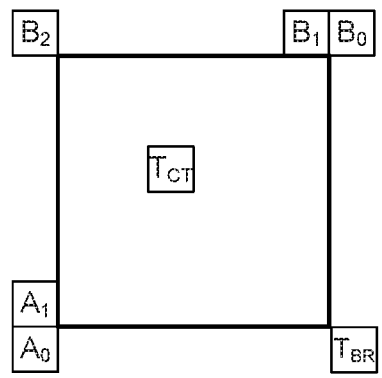
FIG. 1 illustrates the spatial and temporal neighbouring blocks used to derive Merge candidates according to HEVC (High Efficiency Video Coding).
Figure 2:
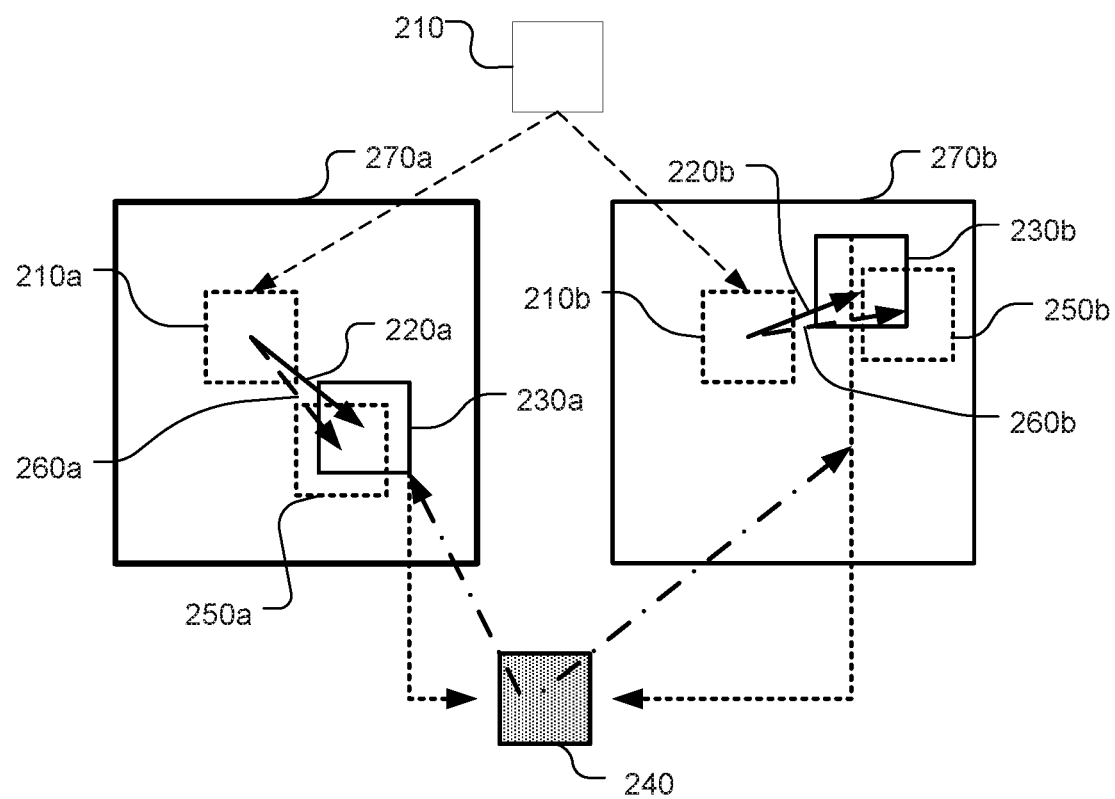
FIG. 2 illustrates an example of Bilateral Template MV Refinement (i.e., Decoder-Side Motion Vector Refinement (DMVR)) process.
Figure 3:
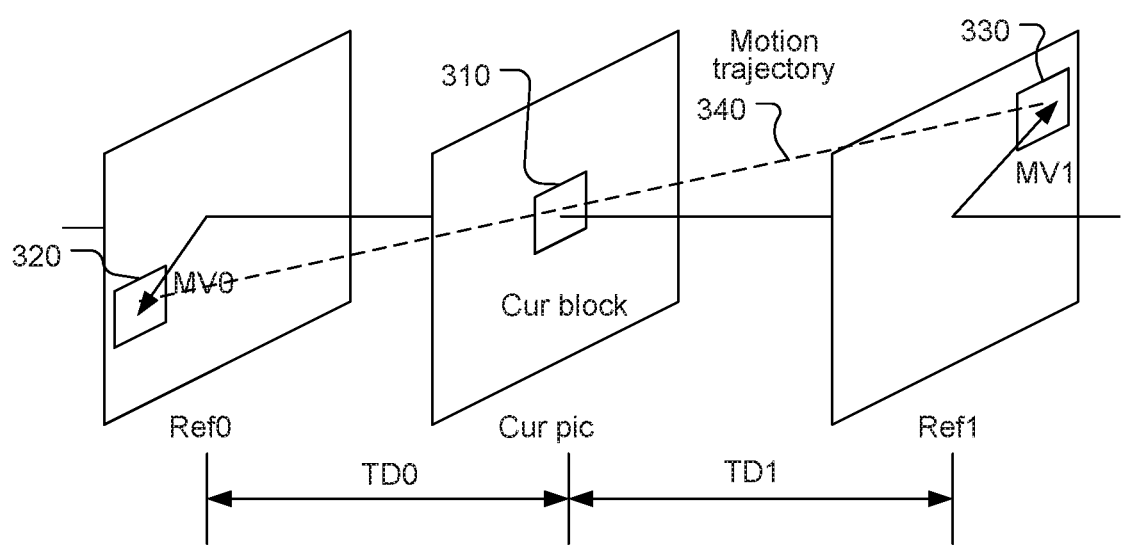
FIG. 3 illustrates an example of FRUC bilateral matching mode, where the motion information for a current block is derived based on two reference pictures.
Figure 4:
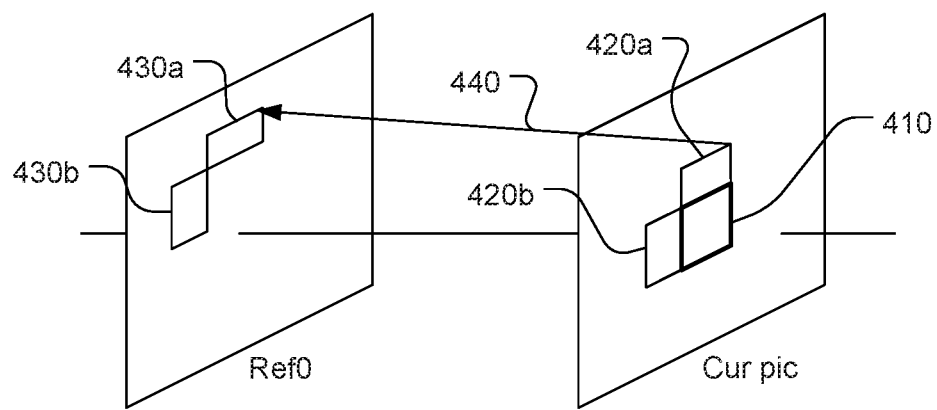
FIG. 4 illustrates an example of template matching FRUC (Frame Rate UpConversion) mode.
Figure 5A:
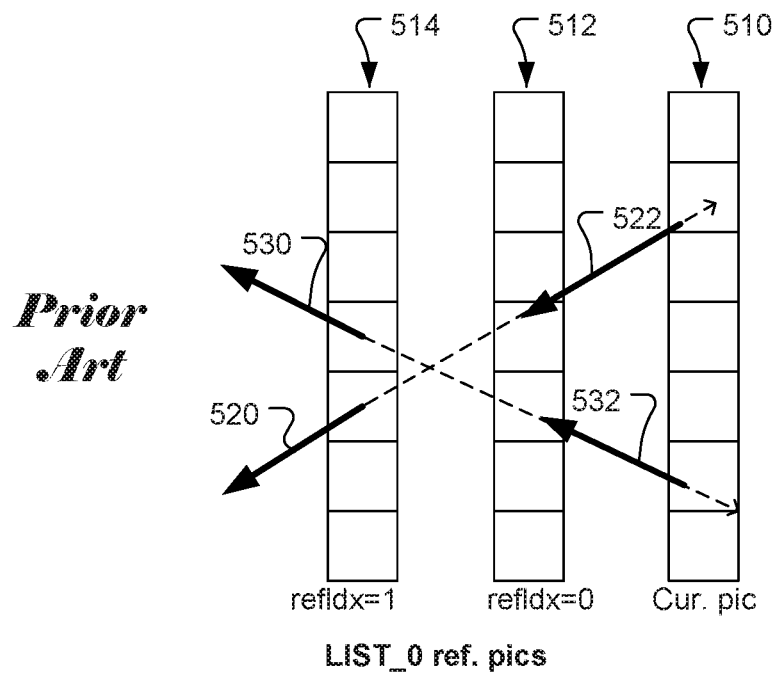
FIG. 5A and FIG. 5B illustrate examples for deriving the temporal derived MVPs for List_0 and List_1 respectively.
Figure 5B:
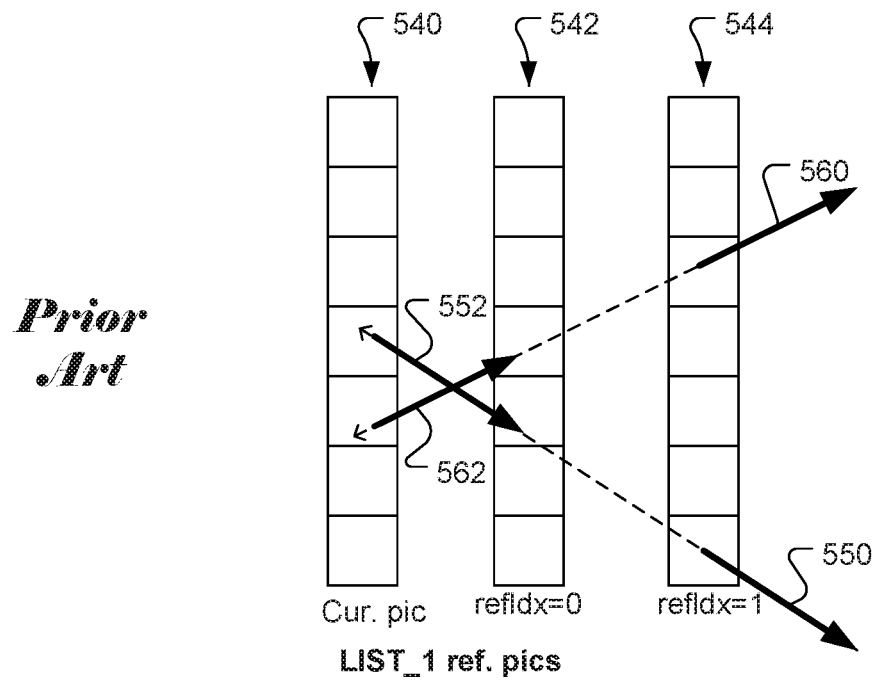
Figure 6:
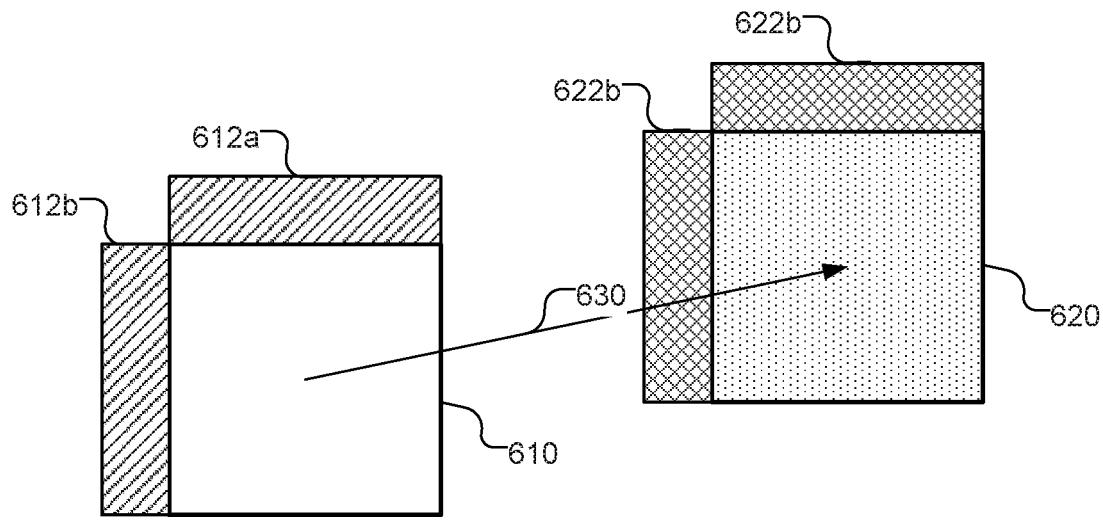
FIG. 6 illustrates an example of deriving the MV resolution of the current block based on the above part and left part of the template.

In the proposed method, the MV resolution of the current block can be derived from its neighbours. The above part and left part of the template can be used to derive the MV resolution of the current block. For example, the above template 612a may correspond to N rows of pixels above the current block 610 (e.g. a CU or PU) having the same width as the current block as shown in FIG. 6. The left template 612b may correspond to N columns of pixels to the left of the current block 610 having the same height as the current block as shown in FIG. 6. When the template is used for evaluating different MV resolutions for the current block, the cost (e.g. distortions) between the pixels of the templates (i.e., 612a and/or 612b) of current block 610 and the corresponding pixels in the templates (622a and/or 622b) of a reference block 620 are calculated. The corresponding reference block is located based on a motion vector pointing from the current block to the reference block as indicated by the MV 630 in FIG. 6. The resolution with the minimum template cost is selected as the MV resolution for the current block.

According to one method of the present invention, the residual of the prediction is not signalled. The encoder and decoder apply the same cost evaluation to the above and left templates for all three MV resolutions. The MV resolution with the smallest cost for the current block is chosen. When the above template is not available, the encoder and decoder will only use the left template. When the left template is not available, the encoder and decoder will only use the above template. When neither the above nor the left template is available, the encoder and decoder will choose a default MV resolution for the current block. The default MV resolution can be one of the supported MV resolutions, such as quarter-pel, integer-pel, or 4-pel.

In another method, the encoder and decoder can signal MV_resolution_Predcition_flag syntax to indicate whether the current block MV resolution is predicted from its neighbour template or not. When the flag indicates that it is predicted from the neighbour template, the encoder and decoder will apply the cost evaluation to the template for all three MV resolutions and choose the one with the smallest cost. Otherwise (i.e., MV_resolution_Predcition_flag indicating not to use template-based method), the correct MV resolution will be signalled. The MV_resolution_Predcition_ flag can be context coded or bypass coded. When it is context coded, it can use N (N being an integer greater than 1) contexts. The context can be select based on information of the above and/or left neighbouring blocks.

In another method, the encoder can signal the difference between the MV resolution used and the MV resolution predicted. At the decoder side, the difference can be parsed. In one embodiment, the encoder and decoder can indicate the quarter-pel MV resolution to be N, integer-pel MV resolution to be N+1, and 4-pel MV resolution to be N+2.

In another embodiment, the order of the indication of each resolution can be different. It is not necessary that the quarter-pel MV resolution to be N, integer-pel MV resolution to be N+1, and 4-pel MV resolution to be N+2. Other possible ordering among the three resolutions for the indication can be supported.

In all the above embodiments of this method, N is an integer number. For example, N can be chosen to be 0.

In yet another embodiments, when the prediction of MV resolution is correct, a prediction error of "0" is signalled; otherwise, when the predictor is quarter-pel resolution while the correct one is integer-pel, a prediction error of "+1" is signalled; and when the predictor is quarter-pel resolution while the correct one is 4-pel, a prediction error of "−1" is signalled. Similarly, using a module system, a sequence of ¼-Pel, 1-Pel, 4-Pel, ¼-Pel, 1-Pel, 4-Pel . . . can be used to represent the neighborhood relationship among these resolutions. When the predictor resolution matches the true resolution, "0" is signalled; otherwise, either "+1" or "−1" is signalled according to the relative neighbouring location between the correct resolution and its predictor. In this example, if the correct resolution is to the right of the predictor resolution, "+1" is signalled; otherwise, if the correct resolution is to the left of the predictor resolution, "−1" is signalled.

One example for binarizing the symbols (i.e., "0", "+1" and "−1") as described above is summarized as follows:

TABLE 1

| To be signalled symbol | Bins |
| --- | --- |
| 0 | 0 |
| +1 | 10 |
| −1 | 11 |

During encoding the MV resolution, the sign and the difference will be calculated and coded. Note these settings are just used for illustrating this method. In general, three consecutive numbers can be used to indicate the three resolutions. In one example, the encoder and decoder set the quarter-pel MV resolution to 1, integer-pel MV resolution to 2, and 4-pel MV resolution to 3. The example of the residual table is show in Table 2.

TABLE 2

| Predicted MV resolution | Actual MV resolution | Difference |
| --- | --- | --- |
| 1 | 1 | 0 |
| 1 | 2 | 1 |
| 1 | 3 | 2 |
| 2 | 1 | −1 |
| 2 | 2 | 0 |
| 2 | 3 | 1 |
| 3 | 1 | −2 |
| 3 | 2 | −1 |
| 3 | 3 | 0 |

As shown in the above table, there are a total of 5 different residual values. To code the 5 residuals, we can use fixed length binarization or variable length binarization.

In one embodiment, Ex-Golomb code is used for the binarization. An example code word table is shown below:

TABLE 3

| Residual | Code word |
| --- | --- |
| 0 | 0 |
| 1 | 10 |
| −1 | 110 |
| 2 | 1110 |
| −2 | 1111 |

In another embodiment, it is proposed to use the prefix and fixed length code words for the binarization. For example, one flag can be signalled to indicate whether the residual is 0 or not. If the residual is not 0, then a prefix "1" can be signalled and followed by 2 bins to indicate which one of the four possible residuals (i.e., −1, 1, −2, 2) is used. An example binarization table is shown in Table 4.

TABLE 4

| Residual | Code word |
| --- | --- |
| 0 | 0 |
| 1 | 100 |
| −1 | 101 |
| 2 | 111 |
| −2 | 110 |

In another embodiment, the residual between different resolutions can use the sign and absolute value to signal. For example, one MV_resolution_predition_no_residual_flag is signalled to indicate if the MV resolution prediction residual is zero or not. When the MV_resolution_prediction_no_residual_flag is 1, the residual between the predicted MV resolution and the current MV resolution is 0, and the predicted MV resolution is used for the current MV resolution. Otherwise, there are residuals. A sign flag MV_resolution_residual_sign_flag is signalled to indicate the sign of the residual. Then followed by the absolute value of the residual MV_resolution_abs_value. Since there are only two residual absolute values, 1 bin is used to signal the absolute value of the residual.

In all the above tables, the code words is just example, and different code words can be easily constructed by changing the 1s and 0s. The order of the residual values can be rearranged.

In the above binarization examples, all the bins can be bypass coded. In another embodiment, there can be up to N contexts used to code each bin.

In the above method, there are three MV resolutions to select. In general, if there are N MV resolutions to select from, these methods can be easily extended.

In addition to MV resolutions, MV signs can be predicted using templates as well. In general, there are 2 signs for each MVD pair and two possible values (i.e., positive and negative) for each sign. Therefore, there are a maximum of 4 possible values to be predicted. If there are only one non-zero MVD in the pair, the possible candidates will become 2. For N possible MV resolutions and M possible MV signs, different methods can be used to predict these N×M combinations.

In one embodiment, a templated-based prediction method can be extended from predicting MV resolutions. Originally, there are only N MV resolutions to be predicted and now the N will be extended to N×M to predict both MV resolutions and MV signs in a time. The prediction will be obtained by searching the smallest cost among the templates for all possible combinations of MV resolutions and MV signs. The predicted residuals can be either signalled or not. Different number and codeword can be given to the individual combinations in order to calculate the residual from prediction.

In another embodiment, a sequential method can be used to predict MV resolutions and MV signs. First, a default MV resolution from N possible values will be assumed in order to predict the MV signs. For example, the MV resolution is assumed to be integer. Based on this assumed integer MV, the MV sign predictor can be obtained by searching the smallest cost among the templates for M possible MV sign positions. After obtaining the sign prediction, the prediction for MV resolution can be processed as mentioned in the previously. Therefore, there are two predictions generated in the sequence and the predicted residuals can be either signalled or not signalled for MV the resolutions and MV signs respectively. In still another embodiment, MV resolutions can be predicted first and then MV signs.

Candidate Reordering of Motion Vector Prediction (MVP) Candidate List

Another aspect of the present invention addresses candidate reordering in order to improve coding efficiency.

Figure 7:
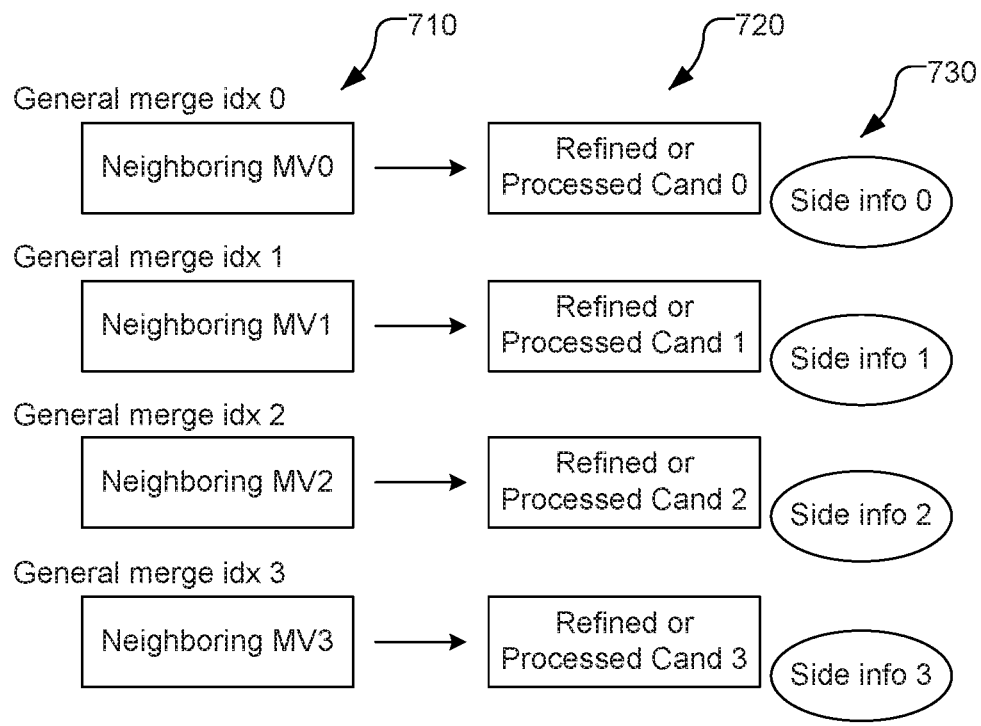
FIG. 7 illustrates a basic framework of a general "prediction+merge" algorithm according to the present invention.

The merge candidates in this disclosure are defined as the candidates of a general framework based on the "prediction+merge" processes. The algorithm is related to the prediction and merge processes. In the first part, a candidate list (i.e., a set) of predictors is generated by inheriting neighbouring information or refining neighbouring information. In the second part, a merge index is used to indicate the selected candidate in the candidate list and/or some side information related to the merge index is sent for a decoder to identify the selected candidate. Accordingly, the decoder is able to inherit the motion information of the "merged" neighbouring block as identified by the merge index. The basic framework of a general "prediction+merge" algorithm is shown in FIG. 7. The candidate list includes multiple candidates 710 corresponding to neighbouring blocks, that the motion information to be inherited. The candidates may be processed or refined to derive new candidates 720. During the processes, some side information 730 may be generated and sent to decoder.

The step of "processing one candidate" may correspond to combining two or more candidates into one candidate. In another example, it may correspond to using the original candidate as an original MV predictor and performing motion estimation search by using current block pixels to find a final MVD (Motion Vector Difference). In this case, the side information corresponds to the MVD. In yet another example, it may use the original candidate as an original MV predictor and perform motion estimation search by using current block pixels to find a final MVD for L0. On the other hand, the L1 predictor is the original candidate. In still yet another example, it may use the original candidate as an original MV predictor and perform motion estimation search by using current block pixels to find a final MVD for L1. On the other hand, L0 predictor is the original candidate. In still yet another example, it may use the original candidate as an original MV predictor and perform the MV refinement search by using top or left neighbouring pixels as search template to find a final predictor. In still yet another example, it may use the original candidate as an original MV predictor and perform MV refinement search by using bi-lateral template (e.g. pixels in L0 and L1 reference pictures pointed by a candidate MV or mirrored MV) as search template to find a final predictor.

Hereafter, in this disclosure, the term "merge candidate" or "candidate" means the candidate in the Merge/Skip mode, or in the AMVP mode, or in the general framework related to the "prediction+merge" algorithm. The framework related to the "prediction+merge" algorithm is not restricted to examples mentioned above.

MVP Candidate Reordering Based on Cost Estimation

Figure 8:
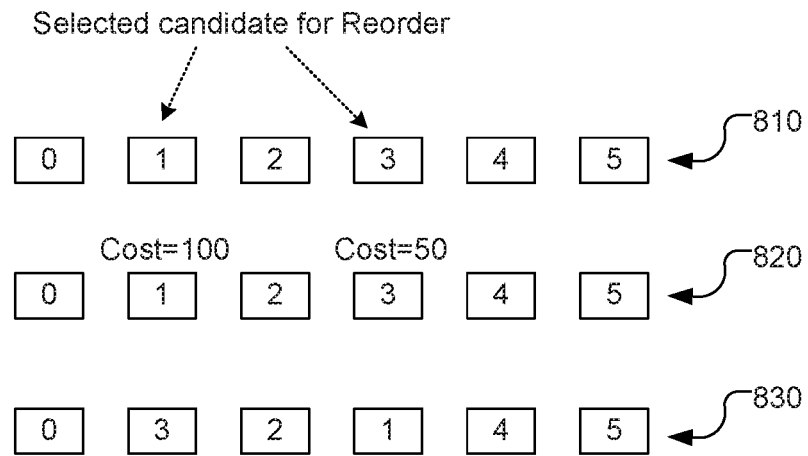
FIG. 8 illustrates an example of Merge Candidate Reorder according to an embodiment of the present invention, where multiple candidates (i.e., candidates 1 and 3 in the example) of the original candidate list are selected for reordering.

In order to improve the coding efficiency, a method named as Merge Candidate Reorder is disclosed. According to this invention, the candidate order within a candidate list is rearranged to achieve better coding efficiency. The reordering rule depends on some pre-calculation or measurement for current candidates, such as upper neighbouring condition (e.g. modes or MVs) or left neighbouring condition (e.g. modes or MVs) of the current CU, the shape of the current CU, or matching result of the up/left L-shape templates. An example of Merge Candidate Reorder is shown in FIG. 8, where multiple candidates (i.e., candidates 1 and 3 in the example of FIG. 8) of the original candidate list 810 are selected for reordering. The costs of the selected candidates

820 are determined, where the cost for candidate 1 is 100 and the cost for candidate 3 is 50 in this example. The cost is referred as the guessing-cost (i.e., estimated cost) of the candidate, where a lower cost means a better candidate. The reordering is then performed for the selected candidate by moving the lower-cost candidate of the selected candidates toward the front of the candidate list. In the example of FIG. 8, candidate 3 has a lower cost than candidate 1. Accordingly, candidate 3 is moved in front of candidate 1 as shown in the reordered list 830. In general, the order candidate Ci in the list can be designated as Oi, i=0~(N−1), where N is total number of candidates. For example, order equal to 0 means the beginning of the list and order equal to (N−1) means the end of the list. Initially, Oi is equal to i. In order words, the ordering of the candidate list is based on an original or conventional method. The Merge Candidate Reorder according to the present invention will rearrange Oi value for selected candidates. The Merge Candidate Reorder includes several important steps:

Step 1, select some candidates (for reorder)

Step 2, calculate the guessing-cost of those selected candidates

Figure 9:
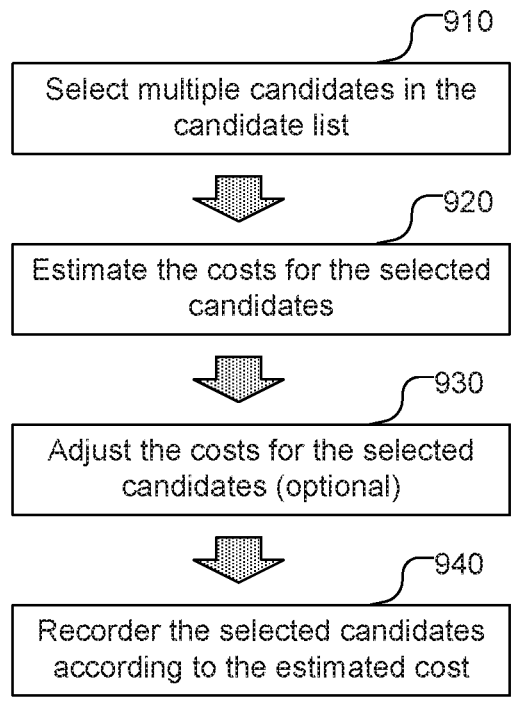
FIG. 9 illustrates a simple flowchart for Merge Candidate Reorder according to an embodiment of the present invention.

Step 3, reorder candidates according to the guessing-cost of those selected candidates A simple flowchart for Merge Candidate Reorder is shown in FIG. 9. In step 910, multiple candidates in the candidate list are selected for reordering. In step 920, the costs for the selected candidates are estimated. In step 930, an optional step for cost adjustment is performed. In step 940, the selected candidates are reordered according to the estimated cost. Note that the Merge Candidate Reorder can be turned on or off according to the current PU size or shape. For example, it can pre-define multiple PU sizes or shapes for turning-off the Merge Candidate Reorder. Moreover, other conditions, such as picture size or QP value can also be used for determining whether to turn off the Merge Candidate Reorder.

Furthermore, according to one embodiment of the present invention, a flag can be signalled to switch on or off for Merge Candidate Reorder. For example, a flag (e.g. "merge_cand_rdr_en") may be signalled to indicate whether "Merge Candidate Reorder" is enabled (e.g. value 1: enabled, value 0: disabled). When not present, the value of merge_cand_rdr_en is inferred to be 1. The minimum size of units for signalling merge_cand_rdr_en can also be separately coded in the sequence level, picture level, slice level, or PU level.

For each step in Merge Candidate Reorder, there are various embodiments. Some examples of for each of those steps are shown as follows.

Step 1: Select Multiple Candidates

There are various ways to select multiple candidates for reordering. For example, all candidates with merge_index<=threshold can be selected. The threshold can be a pre-defined value and the merge_index is the original order within the merge list. If the original order of the current candidate is at the beginning of the merge list, the merge_index for this candidate is 0. In another example, the candidates for reordering are selected according to the candidate type. The candidate type corresponds to the candidate category of all candidates. All candidates can be initially categorized into MG types, where MG is an integer greater than 0. MG_S types can be selected from the MP types for reordering, where MG_S<=MG. For example, all candidates can be categorized into 4 candidate types, where the type 1 candidate corresponds to the MV of a spatial neighbouring block, the type 2 candidate corresponds to the MV of a temporal neighbouring block, the type 3 candidate corresponds to the MV associated with all sub-PU (e.g. Sub-PU TMVP, STMVP, and Affine merge candidate), the type 4 candidate corresponds to the MV of any other candidate. In yet another example, the candidates for reordering can be selected according to both merge_index and candidate type.

Step 2: Calculate the Guessing-Cost of Selected Candidates

Various aspects related to cost estimation are disclosed as follows.

2.1 Template-Based Guessing-Cost Calculation

For estimating the cost of the selected candidates, template matching is used. Two examples of templates are shown in FIG. 10A and FIG. 10B. In FIG. 10A, the template 1012 for a target block 1010 (e.g. a current PU or a reference PU) corresponds to an L-shaped area covering pixels above the target block, pixels to the left of the target block and the pixels to the upper-left corner of the target block. In FIG. 10B, the templates for a target block 1010 (e.g. a PU) corresponds to a number of pixel rows 1014 above the target block and a number of pixel columns 1016 to the left of the target block. The template of a current block and the template of a reference block are used to estimate the cost for a selected candidate. For example, the difference between the template of the current block and the template of the reference block can be compared to estimate the cost. Therefore, in the template-based matching method, there are two important parts, one is the template (e.g. L-shape template) design and the other is the matching algorithm.

2.2 L-Shape Template Design

The L-shape template of a current block includes some pixels around top and left boundaries of the current PU. Similarly, the L-shape template of a reference block includes some pixels around top and left boundaries of the reference block for estimating the cost associated with a current merge candidate. Usually, the template of the reference block has the same shape and the same number of pixels as the template of the current block. The reference block for estimating the cost may correspond to the block pointed by integer part of motion vector of the current merge candidate. The L-shape template of the reference block has several embodiments. In one embodiment, all pixels of L-shape template are outside the reference block for estimating the cost as shown in FIG. 11A, where the L-shaped area 1112 for the current block 1110 and the L-shaped area 1122 for the reference block 1120 are indicated. The reference block 1120 is located based on the motion vector 1140 pointing from the current block 1110. In another embodiment, all pixels of L-shape template 1123 are inside the reference block for estimating the cost. In yet another embodiment, some pixels of L-shape template are outside the reference block for estimating the cost and some pixels of L-shape template are inside the reference block for estimating the cost. FIG. 11B shows another embodiment of template similar to FIG. 11A. However, the template of the current block comprises a number of pixel rows 1114 above the current block 1110 and a number of pixel columns 1116 to the left of the current block 1110. For the reference block 1120, the template of the current block comprises a number of pixel rows 1124 above the reference block 1120 and a number of pixel columns 1126 to the left of the reference block 1120. Again, the inner pixels 1128 of the reference block 1120 may be used. The templates (i.e., 1112 and 1122) in FIG. 11A are referred as full L-shaped templates in this disclosure. On the other hand, the templates (i.e., 1114/1116 and 1124/1126) in FIG. 11B are referred as disjoined L-shaped templates in this disclosure.

In the following, the details of the L-shape matching method are disclosed. Assuming the width of current PU being BW and the height of current PU being BH, the L-shape template of current block has top part and left part. Defining the top thick being TTH and the left thick being LTH, then the top part consists of all pixels located at (ltx+tj, lty−ti), where ltx and lty are the horizontal and vertical coordinates of the upper-left corner pixel of the current PU respectively, ti corresponds to the index for pixel line (0≤ti≤(TTH-1)) of the current block and tj corresponds to the pixel index in a line of the current block (0≤tj≤(BW-1)). For the left part, it consists of all pixels located at (ltx−tjl, lty+til), where tjl is the index of a column of the current block (0≤tjl≤(LTH-1)) and til is the pixel index in a row of the current block (0≤til≤(BH-1)).

Similarly, the L-shape template of reference block comprises a top part and a left part. Defining the top thick being TTHR and the left thick being LTHR, then the top part consists of all reference pixels located at (ltxr+tjr, ltyr−tir+shifty), where ltxr and ltyr are the horizontal and vertical coordinates of the upper-left corner pixel of the reference PU respectively, tir corresponds to the index for pixel line (0≤tir≤(TTHR-1)) of the reference block and tjr corresponds to the pixel index in a line of the reference block (0≤tjr≤(BW-1)). In the above, shifty is a pre-define shift value. For the left part, it consists of reference pixels located at (ltxr−tjlr+shiftx, ltyr+tilr), where tjlr corresponds to the index of column of the reference PU (0≤tjlr≤(LTHR-1)) and tilr corresponds to the pixel index in a row of the reference (0≤tilr≤(BH-1)). In the above, shiftx is a pre-define shift value.

Note that, there is one L-shape template for reference block if the current candidate only has L0 or L1 MV. However, there are two L-shape templates for two reference blocks if the current candidate has both L0 and L1 MVs (i.e., bi-direction candidate). In this case, one reference block in L0 reference picture is pointed by L0 MV, the other reference block in L1 reference picture is pointed by L1 MV.

2.3 Adaptive Thickness of L-Shape Template

For the L-shape template, an adaptive thickness mode is proposed. The thickness is defined as the number of pixel rows for top part in L-shape template or the number of pixel columns for left part in L-shape template. For the L-shape template mentioned above, the top thick is TTH and left thick is LTH for the L-shape template of the current block, and the top thick is TTHR and left thick is LTHR for the L-shape template of reference block. The adaptive thickness mode changes the top thickness or left thickness depending on some conditions, such as current PU size, current PU shape (e.g. width or height) or QP (quantization parameter) of the current slice. For example, the top thickness can be set to 2 if the current PU height is greater than or equal to 32. If the current PU height is less than 32, the top thickness can be set to 1.

2.4 L-Shape Matching Step

In this step, it retrieves the L-shape template for the current block from the current picture and the L-shape template for the reference block from the reference picture. The template of the current block and the template of the reference block are compared (i.e., matched) to estimate the cost associated with a candidate. There are two parts in this step: part 1 to get the selected pixels from the L-shape template for the current block in the current picture and the selected pixels from L-shape template for the reference block of the reference picture; and part 2 to compute the difference.

L-Shape Matching Part 1

In Part 1, we define selected_pixels_cur as the selected pixels from the L-shape template for the current block in the current picture, and the selected_pixels_ref as the selected pixels from the L-shape template for the reference block of the reference picture. There are several embodiments to select some pixels from the L-shape template.

Embodiment 1 of Part 1 of L-Shape Matching

In this embodiment, all pixels of the L-shape template for the current block in the current picture and L-shape template for the reference block of the reference picture are all selected.

Embodiment 2 of Part 1 of L-Shape Matching

Figure 12A:
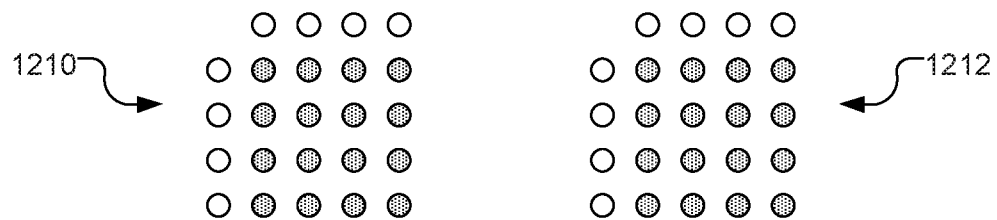
FIG. 12A illustrates an example of L-shape template for a current block and a reference block, where the blank circles indicate template pixels and the filled circles indicate the pixels of the current block or the reference block.
Figure 12B:
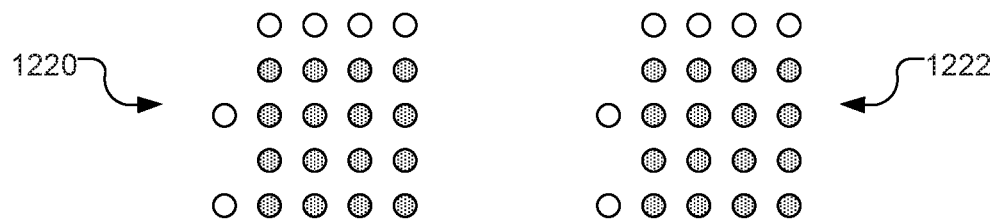
FIG. 12B illustrates an example of 2:1 vertical sub-sampling applied to the left part of the template for the templates shown in FIG. 12A during cost estimation.
Figure 12C:
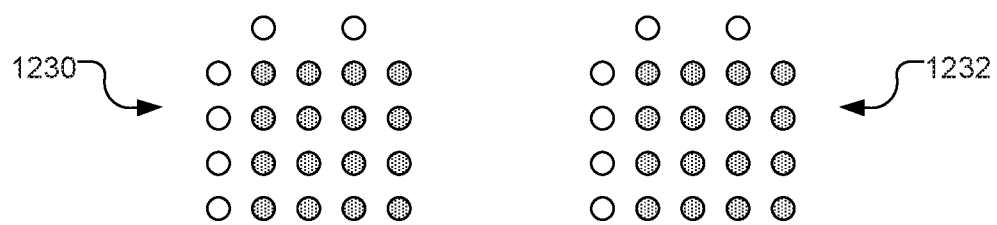
FIG. 12C illustrates an example of 2:1 horizontal sub-sampling applied to the top part of the template for the templates shown in FIG. 12A during cost estimation.
Figure 12D:
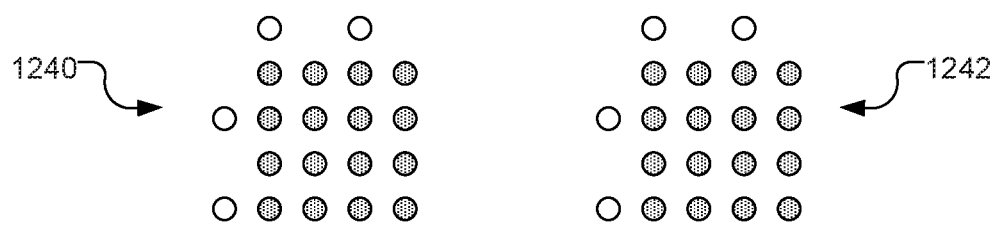
FIG. 12D illustrates an example of 2:1 horizontal sub-sampling applied to the top part of the template and 2:1 vertical sub-sampling applied to the left part of the template for the templates shown in FIG. 12A during cost estimation.

In this embodiment, the L-shape template is sub-sampled. In other words, some pixels for the top part and the left part of the L-shape template are dropped in a sub-sampling manner. For example, 2:1 horizontal sub-sampling may be applied to the top part of L-shape template by dropping pixels at odd horizontal positions or even horizontal positions in the top part of L-shape template. In another example, 2:1 vertical sub-sampling may be applied to the top part of L-shape template, by dropping pixels at odd vertical positions or even vertical positions in the top part of L-shape template. In yet another example, 2:1 horizontal and vertical sub-sampling can be applied to the top part of L-shape template, by dropping pixels at odd vertical positions or even vertical positions in top part of L-shape template and dropping pixels at odd horizontal positions or even horizontal positions in top part of L-shape template. In yet another example, 2:1 horizontal sub-sampling can be applied to the left part of L-shape template, by dropping pixels at odd horizontal positions or even horizontal positions in left part of L-shape template. In another example, 2:1 vertical sub-sampling may be applied to the left part of L-shape template, by dropping pixels at odd vertical positions or even vertical positions in the left part of L-shape template. In yet another example, 2:1 horizontal and vertical sub-sampling can be applied to the left part of L-shape template, by dropping pixels at odd vertical positions or even vertical positions in left part of L-shape template and dropping pixels at odd horizontal positions or even horizontal positions in left part of L-shape template. The sub-sampling may be 2:1 or 4:1 or SN:1, in which SN is a sub-sampling factor. FIG. 12A illustrates an example of L-shape template for a current block 1210 and a reference block 1212, where the blank circles indicate template pixels and the filled circles indicate the pixels of the current block or the reference block. FIG. 12B illustrates an example of 2:1 vertical sub-sampling applied to the left part of the template. FIG. 12C illustrates an example of 2:1 horizontal sub-sampling applied to the top part of the template. FIG. 12D illustrates an example of 2:1 horizontal sub-sampling applied to the top part of the template and 2:1 vertical sub-sampling applied to the left part of the template.

Moreover, the sub-sampling mode can be turned ON or OFF depending on the current PU size. For example, if the current PU size is larger than a pre-defined threshold, the sub-sampling mode can be turned OFF; and if smaller, the sub-sampling mode can be turned ON. In another example, if the current PU size is larger than a pre-defined threshold, the sub-sampling mode can be turned ON; and if smaller, the sub-sampling mode can be turned OFF.

Embodiment 3 of Part 1 of L-Shape Matching

Figure 13A:
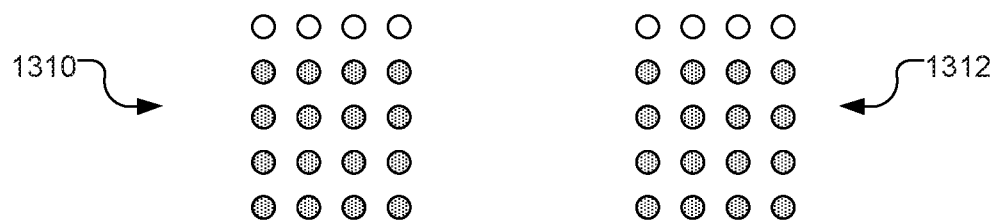
FIG. 13A illustrates an example of dropping all pixels of the left part of the L-shape template of the current block and the reference block for the templates shown in FIG. 12A during cost estimation.

In this embodiment, it drops all pixels of the left part of the L-shape template as shown in FIG. 13A for the current block 1310 and the reference block 1312.

Moreover, the dropping mode can be turned ON or OFF depending on the current PU size. For example, if the current PU size is larger than a pre-defined threshold, the dropping mode can be turned OFF; if smaller, the dropping mode can be turned ON. In another example, if the current PU size is larger than a pre-defined threshold, the dropping mode can be turned ON; and if smaller, the sub-sampling mode can be turned OFF.

Embodiment 4 of Part 1 of L-Shape Matching

Figure 13B:
FIG. 13B illustrates an example of dropping all pixels of the top part of the L-shape template of the current block and the reference block for the templates shown in FIG. 12A during cost estimation.

In this embodiment, it drops all pixels of top part of L-shape template as shown in FIG. 13B for the current block 1320 and the reference block 1322.

Moreover, the dropping mode can be turned ON or OFF depending on the current PU size. For example, if the current PU size is larger than a pre-defined threshold, the dropping mode can be turned OFF; and if smaller, the dropping mode can be turned ON. In another example, if the current PU size is larger than a pre-defined threshold, the dropping mode can be turned ON; and if smaller, the sub-sampling mode can be turned OFF.

Note that, for those pixels not selected for the L-shape matching, there is no need for retrieving those pixels from the current frame memory (e.g. external memory) or from the reference frame memory in order to save memory bandwidth.

L-Shape Matching Part 2

When the selected pixels from the L-shape template of the current block and the reference block are retrieved, the difference between the two templates is calculated. There are several embodiments.

Embodiment 1 of L-Shape Matching Part 2

In this embodiment, the difference between the two templates corresponds to the SAD (Sum of Absolute Differences) between the two L-shape templates. In other words, for one selected pixel PC of L-shape template of current block and one corresponding selected pixel PR of L-shape template of reference block, the SAD for pixel PC is abs(PC—PR). For bi-directional case, for each selected pixel PC of L-shape template of current block and one corresponding selected pixel PRL0 of L-shape template of the reference block in the L0 reference picture, and one corresponding selected pixel PRL1 of L-shape template of the reference block in the L1 reference picture, the SAD for pixel PC is abs(PC−(PRL0+PRL1)/2) or (abs(PC−PRL0)+abs(PC−PRL1))/2.

In this embodiment, the SAD can be replaced with other difference function, such as squared difference or other difference calculation methods.

Embodiment 2 of L-Shape Matching Part 2

In this embodiment, the bilinear filtering is first applied to the L-shape templates. The bilinear filtering has been commonly used for filtering pixels in motion compensation in normal video coding. In this embodiment, the bilinear filtering is applied to the L-shape templates. The filtered pixels of the L-shape templates are used for SAD calculation or other difference calculation between the two templates.

Step 3: Reorder Candidates According to the Estimated Cost of the Selected Candidates After the L-shape matching computation, each selected candidate has an estimated cost value, denoted as GCost_i, where its the candidate index.

In this step, the estimated costs of those selected candidates can be pre-adjusted (pre-adjust GCost_i) optionally.

The selected candidates are then sorted according to the value of pre-adjusted estimated cost of each candidate. The pre-adjustment of estimated costs has several embodiments. In one embodiment, all estimated costs of a certain candidate type are multiplied by a pre-defined constant for this type. The multiplying results are stored back into the estimated costs of those selected candidates. In another embodiment, different pre-defined constants are used for different candidates depending on the merge_index of each candidate.

After the optional pre-adjustment of estimated cost, the selected candidates are sorted according to the value of estimated costs of the candidates. During the sorting, the order of the selected candidates may be changed to a new position in the candidate list. For example, if the order of candidate A is after the order of candidate B in the candidate list and GCost_A for candidate A is better (i.e., smaller cost) than GCost_B for candidate B, then the candidate orders of candidates A and B are swapped (i.e., exchanged). In another embodiment, if the order of candidate A is after the order of candidate B in the candidate list, GCost_A is better (i.e., smaller cost) than GCost_B and the ratio of GCost_B/GCost_A larger than a pre-defined threshold, then the candidate orders of candidates A and B are swapped (i.e., exchanged). During the sorting process, it repeats the "cost-comparing and swapping" process until no more candidate pairs can be swapped.

Group-Based Candidate Reordering

In order to improve the coding efficiency, a group-based candidate reordering method is also disclosed. According to this method, all candidates are categorized into multiple groups. Assuming that all candidates are categorized into MG types, (MG≥2), MG_S groups out of the MG groups are selected for reordering. For example, all candidates are categorized into 4 candidate groups, where group 1 consists of candidate(s) corresponding to MV(s) of spatial neighbouring block(s), group 2 consists of candidate(s) corresponding to MV(s) of temporal neighbouring block(s), group 3 consists of all sub-PU candidates (e.g. Sub-PU TMVP, STMVP and Affine merge candidates), and group 4 consists of all other candidates.

Then, for each group gr_i within MG_S selected groups (gr_i=0, 1, . . . , (MG_S−1)), multiple "feature candidates" inside the group gr_i are selected.

After multiple "feature candidates" inside the group gr_i are selected, the L-shape template with the L-shape matching method is applied to each feature candidate inside group gr_i of the selected groups to get the estimated cost. The estimated costs of feature candidates can represent the total cost for the selected group.

With the total cost for each selected group determined, the candidate groups can be reordered.

Figure 14:
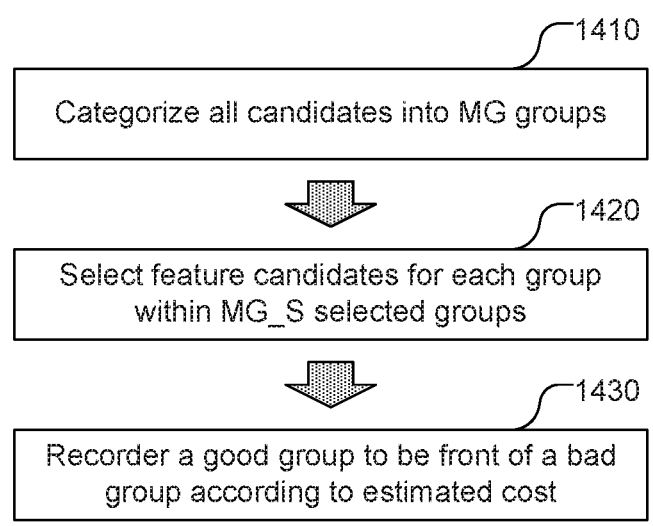
FIG. 14 illustrates an exemplary flowchart comprising the steps of group-based candidate reordering according to an embodiment of the present invention.

It can reorder better candidate group (i.e., a lower cost candidate group) to be front of worse candidate group (i.e., a higher cost candidate group). An exemplary flowchart comprising the steps of group-based candidate reordering is shown in FIG. 14. In step 1410, the candidates are categorized into groups. In step 1420, feature candidates for each group within MG_S selected groups are selected. In step 1430, the candidates are reordered by placing a good group in front of a bad group according to estimated cost.

Merge Candidate Reorder According to CU Partition

Figure 15A:
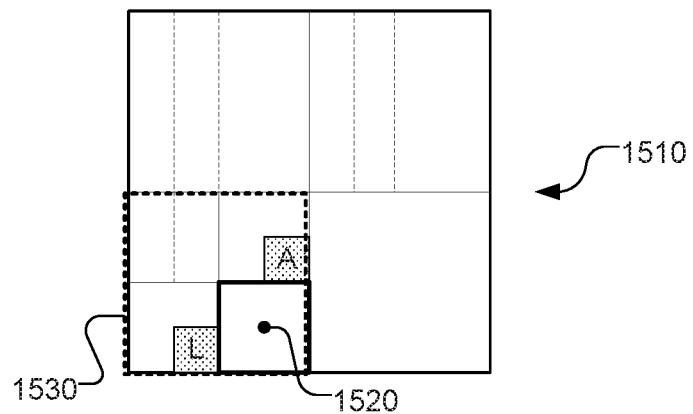
FIG. 15A illustrates an example of candidate reordering based on partition for a current block, where the solid lines correspond to quadtree partition and the dashed lines correspond to binary-tree partition.

In yet another aspect of the present invention, the merge candidate reordering based on block partition is disclosed. The next generation video coding being developed supports more flexible block partition than the conventional video coding standards such as HEVC (high efficiency video coding). The next generation video coding supports quadtree partition as well as binary-tree partition, where the binary-tree partition after the quadtree partition. FIG. 15A illustrates an example of partition result using binary tree plus quadtree, where the solid lines correspond to quadtree partition and the dashed lines correspond to binary-tree partition. For a current CU 1520, the merge candidate from the left L is in front of the merge candidate from above A according to the existing merge list design. According to an embodiment of the present invention, the order of the candidate L and candidate A are swapped if the last coded CU is the left CU (i.e., L). If the left candidate L is better than the above candidate A, these two CU should be merged into a larger CU 1530 as indicated by a dotted-line box.

Figure 15B:
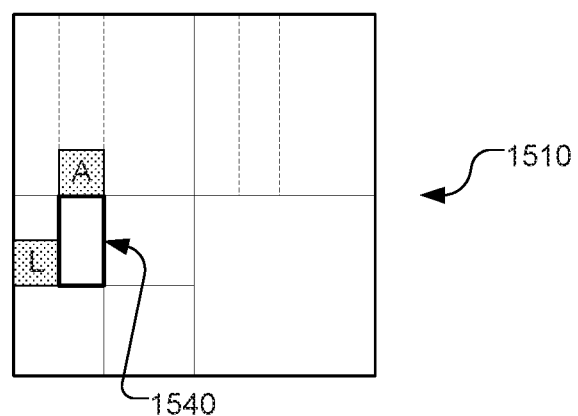
FIG. 15B illustrates another example of candidate reordering based on partition for a current block, where the solid lines correspond to quadtree partition and the dashed lines correspond to binary-tree partition.

FIG. 15B illustrates another example of candidate reordering based on partition for a current block, where the solid lines correspond to quadtree partition and the dashed lines correspond to binary-tree partition. The current block 1540 is indicated. According to this embodiment, the order of the left candidate L and above candidate A is swapped if the last coded CU is the left CU and the left CU and the current CU are in the same BT parent.

Figure 16:
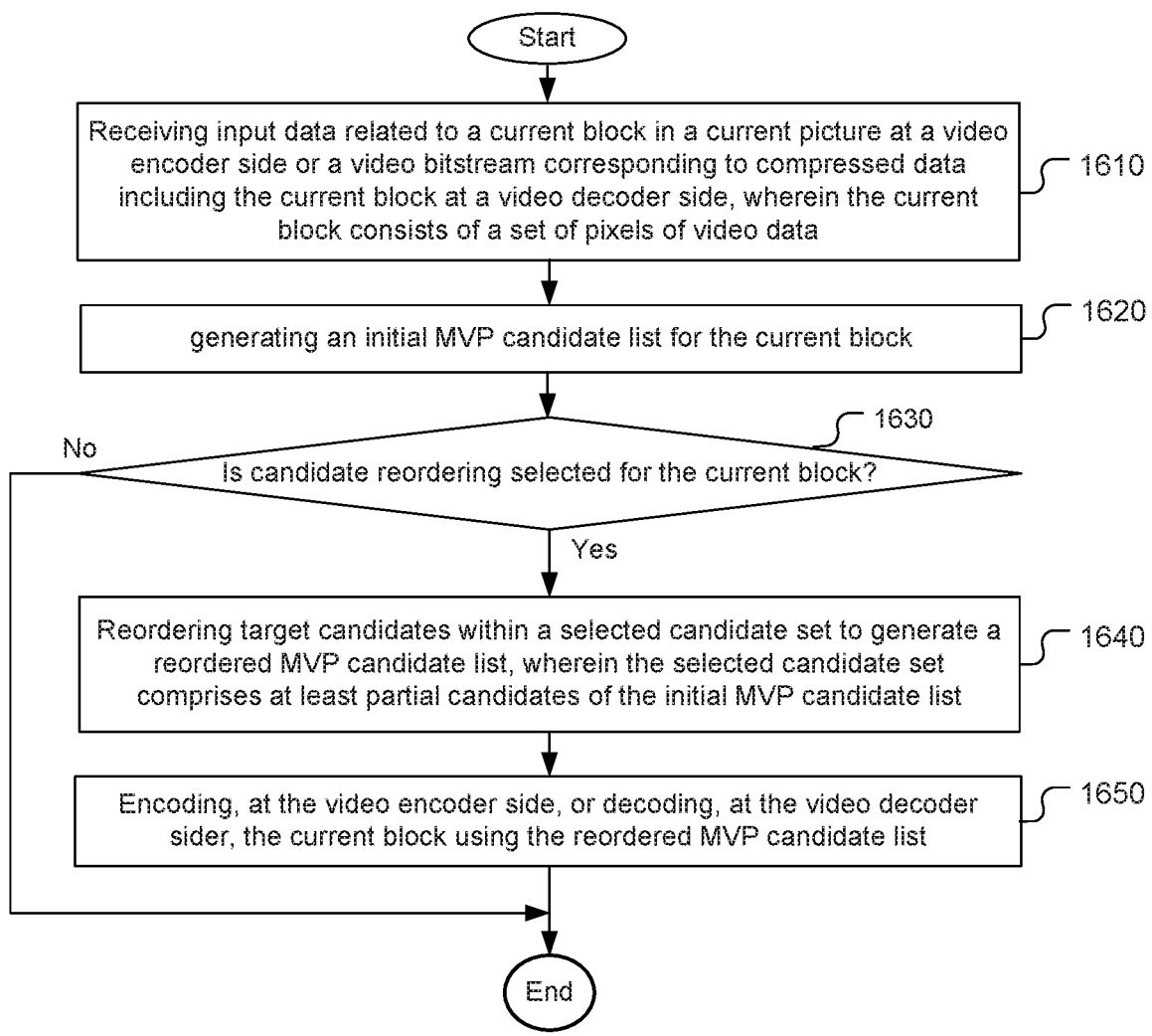
FIG. 16 illustrates an exemplary flowchart of a video coding system using motion vector prediction (MVP) to code a motion vector (MV) associated with a block coded with Inter mode according to an embodiment of the present invention.

FIG. 16 illustrates an exemplary flowchart of a video coding system using motion vector prediction (MVP) to code a motion vector (MV) associated with a block coded with Inter mode according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, input data associated with a current block in a current picture at a video encoder side or a video bitstream corresponding to compressed data including the current block at a video decoder side is received in step 1610, where the current block consists of a set of pixels of video data. An initial MVP candidate list for the current block is generated in step 1620. Whether candidate reordering is selected for the current block is checked in step 1630. If the candidate reordering is selected for the current block, steps 1640 and 1650 are performed. Otherwise (i.e., the "no" path from step 1630), steps 1640 and 1650 are skipped. In step 1640, target candidates are reordered within a selected candidate set to generate a reordered MVP candidate list, where the selected candidate set comprises at least partial candidates of the initial MVP candidate list. In step 1650, the current block is encoded at the video encoder side or decoded at the video decoder sider using the reordered MVP candidate list.

The flowcharts shown above are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of Inter prediction for video coding performed by a video encoder or a video decoder that utilizes motion vector prediction (MVP) to code a motion vector (MV) associated with a block coded with Inter mode, the method comprising:
   receiving input data related to a current block in a current picture at a video encoder side or a video bitstream corresponding to compressed data including the current block at a video decoder side, wherein the current block consists of a set of pixels of video data;
   generating an initial MVP candidate list for the current block; and
   when candidate reordering is selected for the current block:
      reordering target candidates within a selected candidate set to generate a reordered MVP candidate list, wherein the selected candidate set comprises at least partial candidates of the initial MVP candidate list; and
      encoding, at the video encoder side, or decoding, at the video decoder sider, the current block using the reordered MVP candidate list.

2. The method of claim 1, wherein said reordering the target candidates comprises estimating costs of the target candidates based on upper neighbour conditions or left neighbour conditions of the current block, or first template of the current block and second template of one or more corresponding reference blocks.

3. The method of claim 2, wherein the first template of the current block comprises first pixels located above the current block, on a left side of the current block, or both, and the second template of said one or more corresponding reference blocks comprises second pixels located above said one or more corresponding reference blocks, on a left side of said one or more corresponding reference blocks, or both.

4. The method of claim 2, wherein the first template of the current block comprises NC rows of first pixels located above the current block and MC columns of first pixels on a left side of the current block; the second template of said one or more corresponding reference blocks comprises NR rows of second pixels located above said one or more corresponding reference blocks and MR columns of second pixels on a left side of said one or more corresponding reference blocks; and wherein NC, MC, NR and MR are integers greater than 0.

5. The method of claim 4, wherein the first template of the current block further comprises a block of first pixels located across an upper-left corner of the current block to form a first L-shaped area; and the second template of said one or more corresponding reference blocks further comprises a block of second pixels adjacent to an upper-left corner of said one or more corresponding reference blocks to form a second L-shaped area.

6. The method of claim 2, wherein the costs of the target candidates are estimated based on sub-sampled first pixels in the first template of the current block and sub-sampled second pixels in the second template of said one or more corresponding reference blocks.

7. The method of claim 6, wherein whether to use the sub-sampled first pixels and the sub-sampled second pixels for estimating the costs of the target candidates depends on size of the current block.

8. The method of claim 2, wherein for first pixels in the first template of the current block and second pixels in the second template of said one or more corresponding reference blocks, the costs of the target candidates are estimated based on the first pixels above the current block and the second pixels above said one or more corresponding reference blocks only, or based on the first pixels to a left side of the current block and the second pixels to a left side of said one or more corresponding reference blocks only.

9. The method of claim 8, wherein whether to use the first pixels above the current block and the second pixels above said one or more corresponding reference blocks only for estimating the costs of the target candidates or to use the first pixels to a left side of the current block and the second pixels to a left side of said one or more corresponding reference blocks only for estimating the costs of the target candidates depends on size of the current block.

10. The method of claim 2, wherein said one or more corresponding reference blocks are located according to one or more motion vectors of the current block, wherein one corresponding reference block is used for said estimating costs of the target candidates when the current block is uni-predicted, and two corresponding reference blocks are used for said estimating costs of the target candidates when the current block is bi-predicted.

11. The method of claim 2, wherein the costs of the target candidates are estimated based on measurement comprising Sum of Absolute Differences (SAD) and Sum of Squared Differences (SSD) between first pixels in the first template of the current block and second pixels in the second template of one or more corresponding reference blocks.

12. The method of claim 2, wherein bilinear filtering is applied to first pixels in the first template of the current block and second pixels in the second template of one or more corresponding reference blocks, and the costs of the target candidates are estimated based on measurement comprising Sum of Absolute Differences (SAD) and Sum of Squared Differences (SSD) between filtered first pixels and filtered second pixels.

13. The method of claim 2, wherein said estimating costs of the target candidates comprises adjusting initial estimated costs associated with the target candidates.

14. The method of claim 13, wherein the initial estimated costs are adjusted according to candidate type or candidate index.

15. The method of claim 1, wherein said reordering the target candidates within the selected candidate set corresponds to moving a first target candidate to a location in front of a second target candidate when the first target candidate has a lower cost than the second target candidate and the first target candidate is after the second target candidate in the initial MVP candidate list.

16. The method of claim 1, wherein said reordering the target candidates within the selected candidate set moves a first target candidate to a location in front of a second target candidate when the first target candidate has a lower cost than the second target candidate, the first target candidate is after the second target candidate in the initial MVP candidate list, and a ratio of a second cost of the second target candidate to a first cost of the first target candidate is larger than a pre-defined threshold.

17. The method of claim 1, wherein whether the candidate reordering is selected for the current block depends on shape, size or QP (quantization parameter) value of the current block or size of the current picture.

18. The method of claim 1, wherein the selected candidate set corresponds to member candidates of the initial MVP candidate set having a merge index smaller than or equal to a threshold, belonging to one or more selected candidate types, or both.

19. The method of claim 1, wherein the selected candidate set corresponds to member candidates of the initial MVP candidate set belonging to one or more selected candidate types.

20. An apparatus for Inter prediction for video coding performed by a video encoder or a video decoder that utilizes motion vector prediction (MVP) to code a motion vector (MV) associated with a block coded with Inter mode, the apparatus comprising one or more electronic circuits or processors arranged to:
  receive input data related to a current block in a current picture at a video encoder side or a video bitstream corresponding to compressed data including the current block at a video decoder side, wherein the current block consists of a set of pixels of video data;
  generate an initial MVP candidate list for the current block; and
  when candidate reordering is selected for the current block:
    reorder target candidates within a selected candidate set to generate a reordered MVP candidate list, wherein the selected candidate set comprises at least partial candidates of the initial MVP candidate list; and
  encode, at the video encoder sider, or decode, at the video decoder sider, the current block using the reordered MVP candidate list.

* * * * *